United States Patent
Kim et al.

(10) Patent No.: US 7,152,145 B2
(45) Date of Patent: Dec. 19, 2006

(54) METHOD FOR OPTIMIZING SYSTEM PERFORMANCE BY TRANSFERRING A STACK IN A REAL TIME OPERATING SYSTEM

(75) Inventors: Lang Ki Kim, Daejeon (KR); Kyeong Chang Choi, Kyunggi-do (KR)

(73) Assignees: Hoseotelnet Co. Ltd., Seoul (KR); Institute of Information Technology Assessment, Daejeon (KR)

( * ) Notice: Subject to any disclaimer, the term of this patent is extended or adjusted under 35 U.S.C. 154(b) by 621 days.

(21) Appl. No.: 10/421,414

(22) Filed: Apr. 23, 2003

(65) Prior Publication Data

US 2005/0033897 A1    Feb. 10, 2005

(51) Int. Cl.
  *G06F 12/00* (2006.01)
(52) U.S. Cl. .................. 711/159; 711/167; 718/100; 718/101; 718/102
(58) Field of Classification Search ............. 718/100, 718/101, 102; 711/167, 159
See application file for complete search history.

(56) References Cited

U.S. PATENT DOCUMENTS

| | | | |
|---|---|---|---|
| 5,961,626 A * | 10/1999 | Harrison et al. | 710/305 |
| 6,240,358 B1 | 5/2001 | Kawai | |
| 6,385,638 B1 * | 5/2002 | Baker-Harvey | 718/107 |
| 6,430,594 B1 | 8/2002 | Akiyama et al. | |
| 6,964,048 B1 * | 11/2005 | Isham | 718/104 |
| 7,028,299 B1 * | 4/2006 | Chang | 718/104 |

* cited by examiner

*Primary Examiner*—Donald Sparks
*Assistant Examiner*—Yaima Campos
(74) *Attorney, Agent, or Firm*—Madson & Austin

(57) ABSTRACT

The present invention provides a method of improving the speed of processing of a system and optimizing system performance in RTOS by searching for a task on which occupancy time is the longest in a system mode and transferring a stack from an armored memory to an embedded memory, and by reallocating the stack pointers. According to the present invention, since a microprocessor which has an expensive and large embedded memory does not have to be mounted, costs of manufacturing in mass production can be lowered.

2 Claims, 5 Drawing Sheets

Armored RAM

METHOD FOR OPTIMIZING SYSTEM PERFORMANCE BY TRANSFERRING A STACK IN A REAL TIME OPERATING SYSTEM

FIELD OF THE INVENTION

The present invention relates to a method for optimizing system performance by transferring a stack in a real time operating system (hereinafter referred to as 'RTOS'). More particularly, the present invention relates to a method for improving and optimizing system performance in RTOS by detecting operating time and times of each task by means of a self-diagnostic program for task management and by arbitrarily changing the position of a stack.

The present invention provides a method of improving the speed of processing of a system and optimizing system performance in RTOS by the steps of booting an application program by means of RTOS on a target board, monitoring operating time and times of each task by a timer and a random data memory being used, and transferring a stack of the task which has been used the most to an embedded RAM (e.g., static Random Access Memory).

BACKGROUND OF THE INVENTION

Conventional RTOS processor has an embedded RAM in a microprocessor on a target board to enhance the speed of processing OS (operating system). However, RAM of a small size has been used in the RTOS processor due to the cost and some problems relating to designing of the processor.

Accordingly, in most systems, RAM is mounted outside so that stacks for a user mode having a comparatively large size of stacks can be mounted on the outside RAM, while interrupt vector tables and stacks of a system mode which influence relatively more on the speed of the system are allocated on the embedded RAM.

However, in the method having such a randomly fixed memory structure as described above, there is a problem that the speed of the system is slow.

SUMMARY OF THE INVENTION

An object of the present invention is to provide a method for optimizing system performance by using the transfer of a stack in RTOS, to enhance the speed of processing of a system in RTOS by measuring and diagnosing operating time and times of a task in the stack of an armored RAM, reallocating stack pointers, and transferring the stack of a certain task to an embedded RAM.

The above object of the present invention can be achieved by checking whether it is time to change stack pointers (SP) of a task, searching for a task on which occupancy time is the longest in operating a program, transferring the stack of the searched task to a reserved area of an embedded RAM, and then finding tasks to be processed at the moment so that the tasks can be processed rapidly in a real time.

As described above, by searching for a task on which occupancy time is the longest in a system mode and transferring a stack from an armored memory to an embedded memory, and by reallocating the stack pointers, it becomes possible to enhance the speed of processing and the system performance. Also, since a microprocessor which has an expensive and large embedded memory does not have to be mounted, costs of manufacturing in mass production can be lowered.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention, wherein.

DETAILED DESCRIPTION OF THE PREFERRED EMBODIMENTS

Reference will now be made in detail to a preferred embodiment of the present invention in conjunction with the accompanying drawings.

Figure 1:
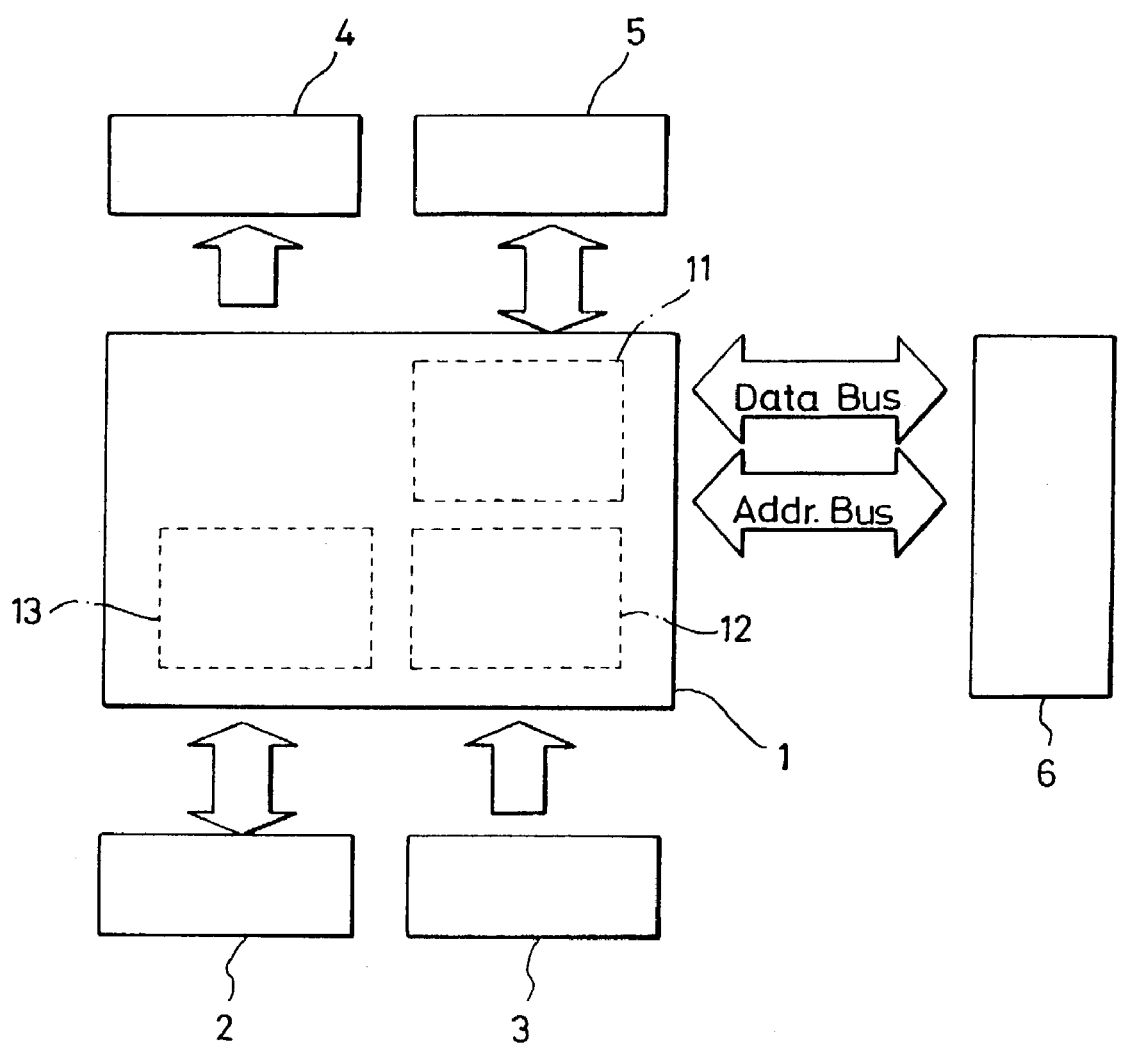
FIG. 1 is a block diagram of a system to which the method of the present invention is applied.

As shown in FIG. 1, a real time operating system in the present invention comprises: a microcomputer (1) having an embedded RAM (11), a flash memory (13) and EEPROM (electrically erasable and programmable read only memory) (12) to generally control the system through a certain program; input/output parts (2); a power supply (3) to provide power supply voltage to each part; a display (4) to indicate results of operation of the system; an interface (5) for data communication with external devices; and an armored RAM (6) in which various data and programs are memorized.

Figure 2:
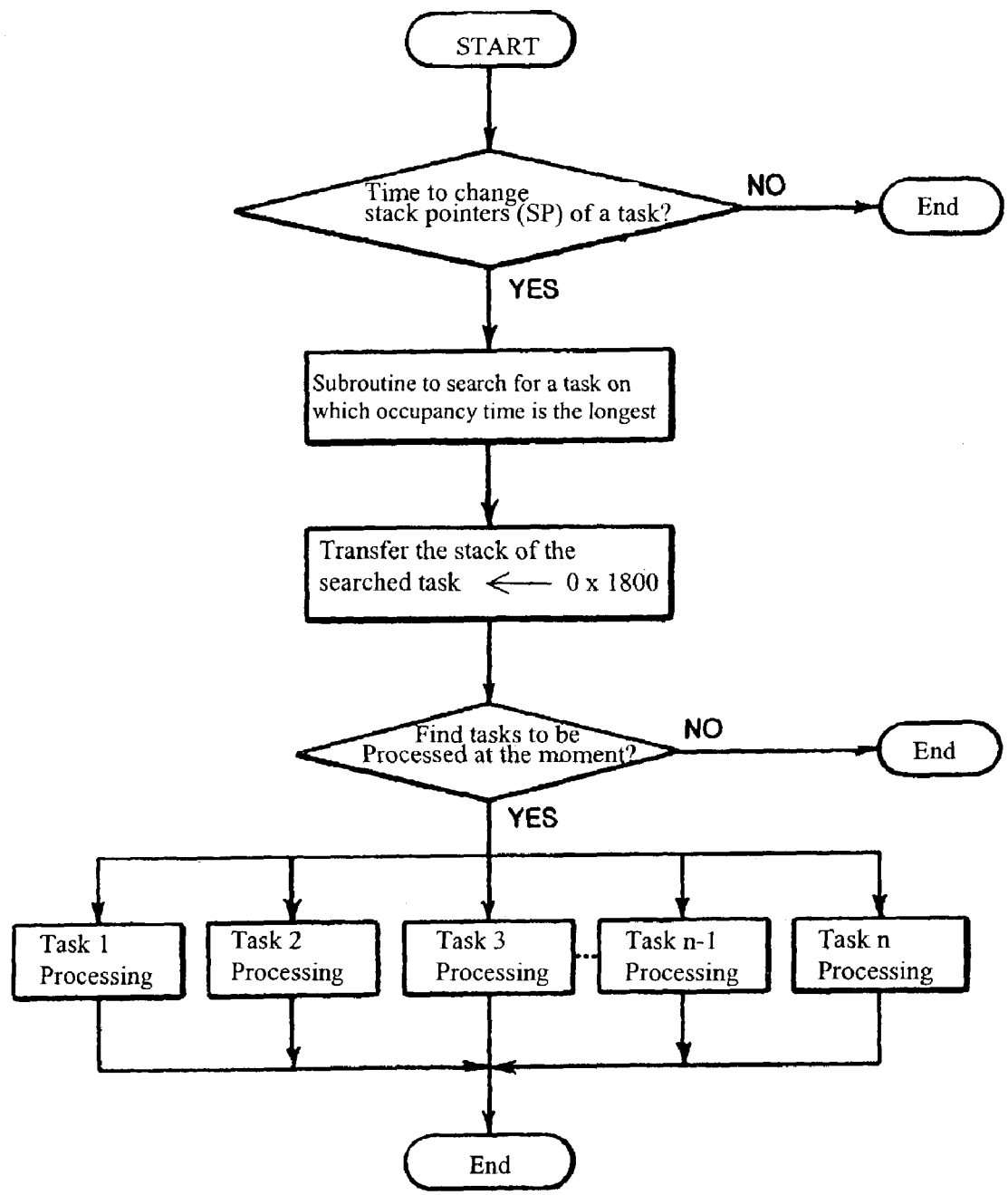
FIG. 2 is a main flow chart to explain the method of the present invention.

According to the present invention, in order to control the stack pointer in the real time operating system as described above, the method for optimizing system performance as shown in FIG. 2 comprises the steps of:

continuously detecting whether it is time to change stack pointers (SP) of a task by means of a task management program which is usually memorized in the microcomputer (1);

if it is time to change stack pointers (SP), performing a subroutine to search for a task on which occupancy time is the longest in operating the program;

if the task on which occupancy time is the longest is found, transferring the stack of the task to a reserved area of the embedded RAM (11);

finding tasks to be processed at the moment by means of a task scheduler in a memory map of the transferred stack; and processing the tasks.

Figure 3:
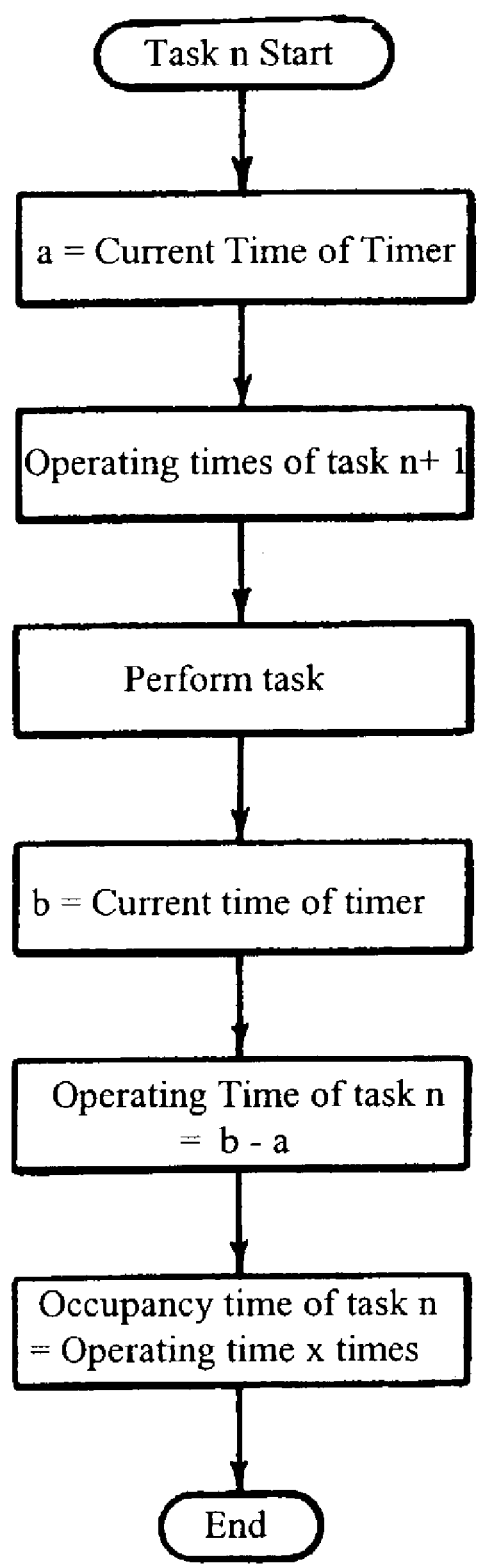
FIG. 3 is a sub-flow chart showing the steps of searching for a task on which occupancy time is the longest in the present invention.

As shown in FIG. 3, the subroutine to search for the task on which occupancy time is the longest comprises the steps of:

memorizing a current time (a) of the timer of the task (n) in a buffer;

performing a corresponding task by increasing the operating time of the task (n) by "1" each time when the task (n) is operated;

memorizing a current time (b) of the timer of the task (n) in the buffer;

subtracting the time (a) from the time (b) to obtain an operating time of the task (n); and multiplying the operating time of the task (n) by the operating times to obtain the occupancy time of the task (n), so that the task on which occupancy time is the longest can be searched for each task.

Figure 4A:
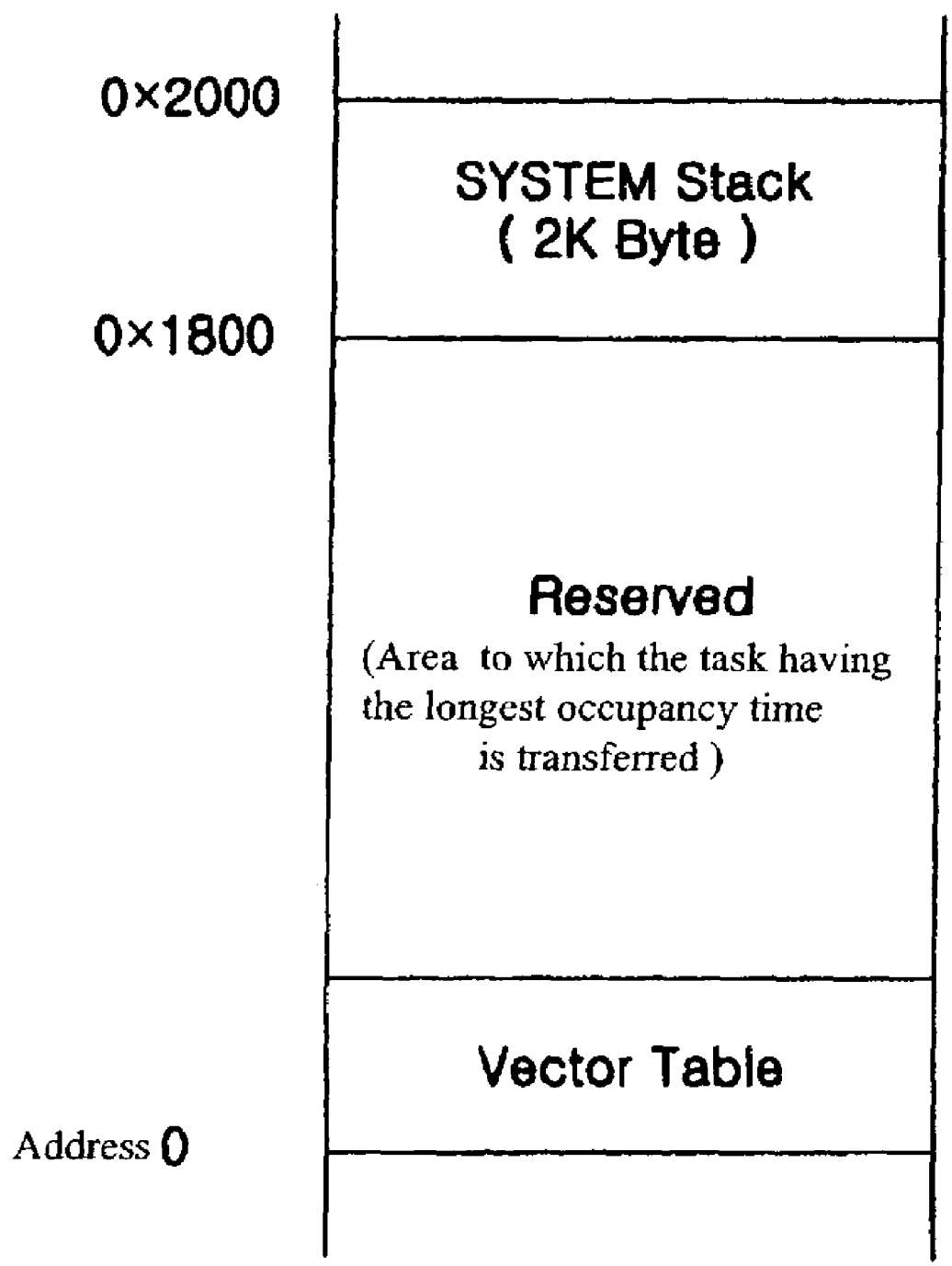
FIGS. 4a and 4b are maps of an embedded and an armored memory of a stack pointer according to the present invention.
Figure 4B:
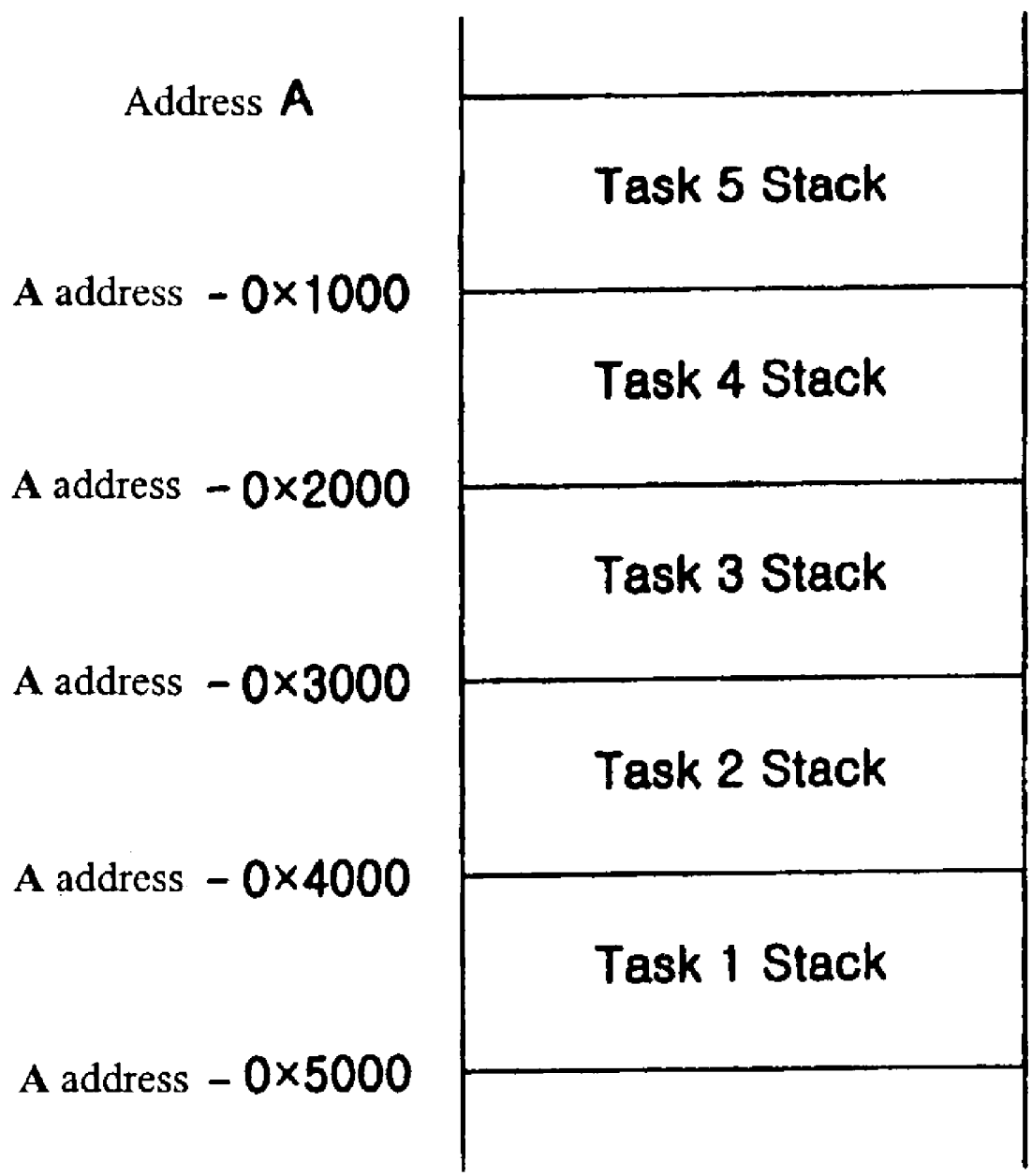

FIGS. 4a and 4b show embedded and armored memory maps of stack pointers according to the present invention, wherein the armored RAM (6) has stacks of user tasks. Among the tasks, the task on which occupancy time is the longest is searched, and then the stack of the task is transferred to the reserved area (less than 0×1800) of the embedded RAM (11). Therefore, the operating speed and system performance can significantly be improved compared to conventional systems.

For example, in a system having the 8 K bytes embedded RAM (11) and the 2 M bytes armored RAM (6), assuming that a vector table does not usually exceed 100 bytes, the system mode of which task depth is not deep uses 2 K bytes, and each of 5 tasks needs 5 K bytes stack respectively, the tasks will have the following data structure after the system has been booted, which will be unchanged until the operating system (O/S) is finished.

TABLE 1

| Task name | Stack size | Operating time | Operating times | Occupancy time in total |
| --- | --- | --- | --- | --- |
| Task 1 | 4K bytes | 10 μsec | 2 | 20 μsec |
| Task 2 | 4K bytes | 20 μsec | 2 | 40 μsec |
| Task 3 | 4K bytes | 30 μsec | 3 | 90 μsec |
| Task 4 | 4K bytes | 40 μsec | 4 | 160 μsec |
| Task 5 | 4K bytes | 50 μsec | 1 | 50 μsec |

Therefore, for example, if operating time and times of tasks for t seconds are those in the above table, the task 4 is the task which is used the most. Based on these data, the stack of the task 4 is transferred to the embedded memory to be performed therein.

In RTOS according to the present invention, as the stack of a task is transferred in a system mode and as the stack point in the system mode is the stack point allocated initially, by reallocating the stack points of the embedded RAM based on the above data, the processing time can be shortened and the system performance can be enhanced.

According to the present invention, it is not necessary to adopt an expensive microcomputer in order to enhance the system performance, but as the stack of a task on which occupancy time is the longest in the system mode is transferred from the armored memory to the embedded memory, the processing time can be decreased and the system performance can be increased. Also, as it is not necessary to have expensive embedded memory, the costs of manufacture in mass production can be reduced.

It will be apparent to those skilled in the art that various modifications and variations can be made to the present invention without departing from the spirit and scope of the invention. The present invention covers the modifications and variations thereof provided they come within the scope of the appended claims and their equivalents.

What is claimed is:

1. A method for optimizing system performance by transferring a stack in a real time operating system comprising: a microcomputer (1) having an embedded RAM (11), a flash memory (13) and EEPROM (electrically erasable and programmable read only memory) (12) to generally control the system through a certain program; input/output parts (2); a power supply (3) to provide power supply voltage to each part; a display (4) to indicate results of operation of the system; an interface (5) for data communication with external devices; and an armored RAM (6) in which various data and programs are memorized, wherein the method comprises the steps of:

continuously detecting whether it is time to change stack pointers (SP) of a task by means of a task management program which is memorized in the microcomputer (1), wherein, if it is not time to change the stack pointers (SP), the task management program continues to check the task;

if it is time to change stack pointers (SP), performing a subroutine to search for a task on which occupancy time is the longest in operating a program;

if the task on which occupancy time is the longest is found, transferring the stack of the task to a reserved area of the embedded RAM (11);

finding tasks to be processed by means of a task scheduler in a memory map of the transferred stack; and processing the tasks found.

2. The method as claimed in claim 1, wherein the subroutine to search for the task on which occupancy time is the longest comprises:

memorizing a current time (a) of a timer of the task (n) in a buffer;

performing a corresponding task by increasing the operating time of the task (n) by "1" each time when the task (n) is operated;

memorizing a current time (b) of the timer of the task (n) in the buffer;

subtracting the time (a) from the time (b) to obtain an operating time of the task (n); and multiplying the operating time of the task (n) by the operating times to obtain the occupancy time of the task (n), so that the task on which occupancy time is the longest can be searched for each task.

* * * * *